United States Patent [19]

Okamoto

[11] 4,168,321

[45] Sep. 18, 1979

[54] PRESS-FORMED TABLET-SHAPE SWEETS

[75] Inventor: Toshiro Okamoto, Nara, Japan

[73] Assignee: Hamada Foods Chemical Industries Co., Ltd., Higashiosaka, Japan

[21] Appl. No.: 900,136

[22] Filed: Apr. 26, 1978

[30] Foreign Application Priority Data

Apr. 27, 1977 [JP] Japan .............................. 52-54587[U]

[51] Int. Cl.² .............................................. A23G 3/00
[52] U.S. Cl. ..................................... 426/87; 426/249; 426/250; 426/104; 426/144; 426/540
[58] Field of Search ................. 426/249, 660, 87, 144, 426/256, 540, 104; 424/15; 425/406

[56] References Cited

PUBLICATIONS

Little, et al., Tablet Making, Northern Pub. Co., Ltd., Liverpool, Eng. 1949, pp. 46–47, 96–97, 107–108, 69–71.
Bush, Ed. Skuse's Complete Confectioner, Bush & Co., Ltd, Hackney, Eng. 1957, pp. 255–262.

*Primary Examiner*—Jeanette M. Hunter
*Attorney, Agent, or Firm*—Amster, Rothstein & Engelberg

[57] ABSTRACT

A press-formed tablet-shape sweet colored only on its outer surfaces by selectively applying a coloring agent after the sweet has been press-formed. The surface to be colored may be land portions or lower portions.

4 Claims, 11 Drawing Figures

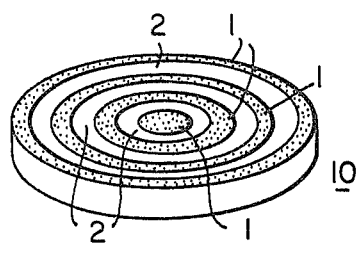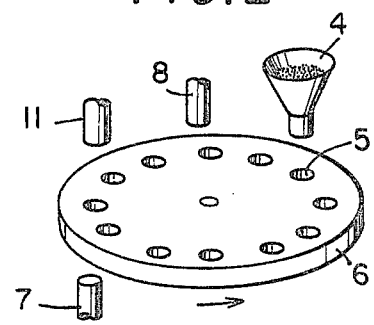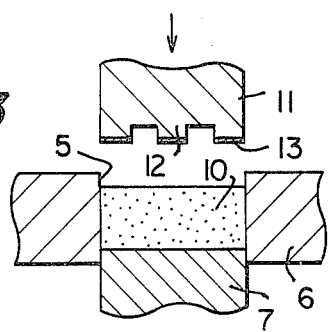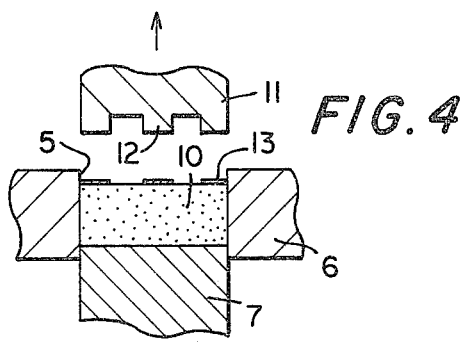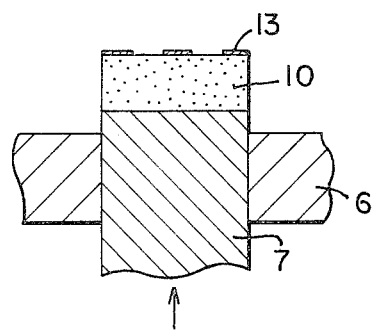

007
PRESS-FORMED TABLET-SHAPE SWEETS

BACKGROUND OF THE INVENTION

1. Field of the Invention

This invention relates to press-formed tablet-shape sweets.

2. Description of the Prior Art

When pictures, designs, marks or the like are desired to be applied to a press-formed sweet in the tablet shape, such pictures, designs, marks or the like are provided in relief, i.e., by concave or convex portions formed on the external surface of the body of such a sweet.

However, such concave or convex portions have conventionally been in the same color as that of the sweet body, resulting in lack of distinction and beauty of the displayed designs or the like.

When it is desired to provide colored patterns on the tablet-shape sweet, a common practice has been to combine materials of different colors into a desired pattern. This method is complex and requires complicated machines.

SUMMARY OF THE INVENTION

Accordingly, an object of the present invention is to provide press-formed tablet-shape sweets on which a colored pattern is provided.

Another object of the present invention is to provide a simple method for manufacturing press-formed tablet-shape sweets on which a colored pattern is provided.

BRIEF DESCRIPTION OF THE DRAWINGS

FIG. 1 is a perspective view illustrating a press-formed tablet-shape sweet of the present invention;

FIG. 2 is a schematic perspective view of a part of a device for manufacturing the tablet-shape sweets of the present invention;

FIG. 3 to FIG. 5 are schematic cross-sectional views illustrating the steps of manufacturing the tablet-shape sweets;

DESCRIPTION OF THE PREFERRED EMBODIMENTS

Figure 6:
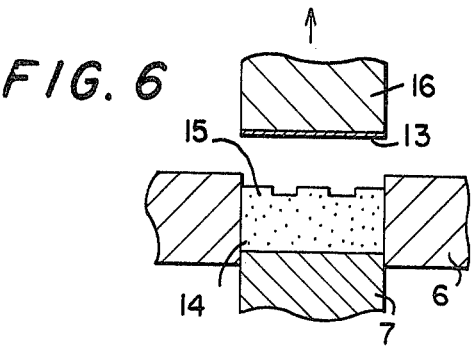
FIGS. 6 and 7 are schematic cross-sectional views showing the steps of another method for manufacturing the tablet-shape sweets according to the present invention.

Referring now to the embodiments of the present invention shown in the drawing, a plurality of concentric annular convex portions 1 are formed on both surfaces of a sweet body 10 and a color different from that of the sweet body 10 is applied to these convex portions 1.

Alternatively, only concave portions 2 may be colored, or both concave and convex portions 2 and 1 may be colored. In the later case, it would be possible to apply to the convex portions a color different from that to be applied to the concave portions. By so doing, the sweet would become very colorful (full of color, varicolored) in its entirety.

Of course the present invention may also be applied to a sweet the surface of which is flat.

Coloring agents to be used in the present invention include edible tar colors, natural tar colors or their solution and mixtures with edible material, and material capable of coloring other than colors (food additive, for example, caramel, β-carotin, copper chlorophyle, chlorella sodium copper chlorophyline, sodium iron chlorophyline, vitamin A, coffee, cocoa, chocolate) or its solution.

The tablet-shape sweet as illustrated in FIG. 1 is manufactured by a method as shown in FIGS. 2 to 11. The sweet to be colored according to the method of the present invention is formed by a conventional method.

The powder material is supplied from a hopper 4 into a plurality of bores 5 formed in a rotating disc 6. The bore 5 has inserted therein a lower punch 7 which forms a bottom of the bores 5. When a predetermined amount of powder material is supplied into the bore 5, a upper punch 8 is lowered to press-form the sweet within the bores 5.

FIG. 3 shows the press-formed sweet 10 within the bore 5 formed in the rotatable disc 6. In the Figure, the lower punch 7 is still partly inserted in the bore 5 while the upper punch 8 has already been removed from the bore 5. It is seen that, instead of the upper punch 8, a printing punch 11 is placed above the sweet 10 in the bore 5. The printing punch 11 has in its lower face a relief or a land portion 12 of a desired pattern on which a coloring agent 13 is applied.

FIG. 4 illustrates the printing punch 11 after it has been stamped on the sweet 10 in the bore 5 and has been separated therefrom. The coloring agent 13 which had been on the printing punch 11 is now transferred to the surface of the sweet 10 to print a desired pattern or design thereon.

Thereafter, the sweet 10 is removed from the bore 5 by moving the lower punch 7 relative to the rotatable disc 6 as illustrated in FIG. 5. The printed sweet 10 can now be transferred for distribution as in the usual manner.

Figure 7:
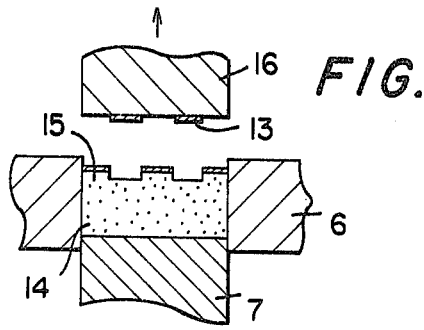

FIG. 6 illustrates another embodiment of the present invention in which a sweet 14 has a press-formed relief 15 of a desired pattern on its surface. In this case, since the sweet 14 has a land portion, the printing punch 16 may have a flat printing surface. FIG. 7 illustrates the situation after the upper punch 16 has been lifted from the sweet 14. The sweet 14 may be removed from the bore 5 in a manner similar to that shown in FIG. 5.

Figure 8:
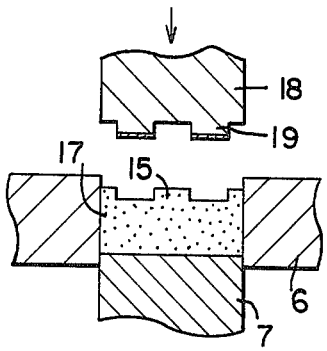
FIGS. 8 and 9 are schematic cross-sectional views showing the steps of still another embodiment of the present invention.
Figure 9:
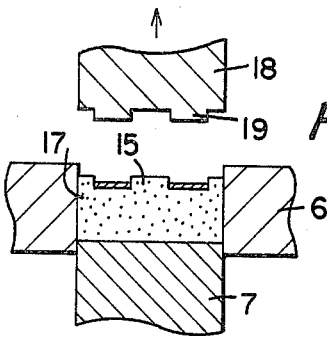

FIGS. 8 and 9 show still another embodiment of the present invention, in which the lower portion of the sweet 17 can be colored by an upper punch 18 having a corresponding relief portion 19 on its lower portion. The height of the relief portion 19 of the printing punch 18 should be slightly greater than the height of the land portion of the sweet 17 in order not to destroy the top surface of the sweet 17. In other respects, the method is the same as that shown in FIGS. 3 to 5.

Figures 10, 11:
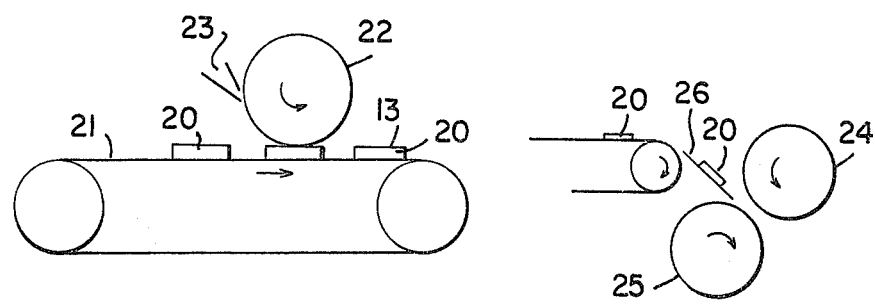
FIGS. 10 and 11 are schematic diagrams illustrating still other embodiments of the present invention.

Other measures for coloring the sweet are schematically illustrated in FIGS. 10 and 11. In FIG. 10, the sweet 20 press-formed by a conventional method is fed by a conveyor belt 21 into a coloring roller 22 on which a coloring agent is applied from a suitable feeder 23. FIG. 11 shows an apparatus for coloring the press-formed sweet 20 at both its major surfaces simultaneously, in which the sweet 20 is fed into a pair of parallel printing rollers 24 and 25 by a slant plate 26.

In accordance with the present invention, distinct designs may be provided on a sweet, so that such a sweet may be beautifully formed, thereby to appeal to the eye and stimulate children's interest.

What is claimed is:

1. In combination with a press-formed sweet of tablet shape comprising a powder material core having a lower surface and an upper surface which includes spaced concave land portions;
   a lower punch to form said lower surface and hold said core in place;
   a printing punch having spaced convex land portions corresponding to said concave land portions; and
   said convex land portions formed to be positionable within said concave land portions to transfer a coloring agent from said convex land portions to said concave land portions.

2. The combination according to claim 1 wherein the height of said convex land portions is greater than the depth of said concave land portions.

3. A method of manufacturing a press-formed sweet in tablet shape comprising the steps of
   forming a powder material core with upper and lower surfaces by supplying powder to a bore and compressing the powder between a lower punch and an upper punch which is shaped to provide spaced concave land portions in the upper surface;
   removing the upper punch and lowering onto the upper surface a printing punch having spaced convex land portions corresponding to the concave land portions; and
   fitting the convex land portions by downward movement into the corresponding concave land portions to transfer a coloring agent from the convex land portions to the concave land portions.

4. The method of claim 3 including the steps of forming the height of the convex land portions to be greater than the depth of the concave land portions, and removing the printing punch by upward movement to allow removal of the completed press-formed sweet by further upward movement of the lower punch.

* * * * *